United States Patent
Xin et al.

(10) Patent No.: US 10,732,618 B2
(45) Date of Patent: Aug. 4, 2020

(54) MACHINE HEALTH MONITORING, FAILURE DETECTION AND PREDICTION USING NON-PARAMETRIC DATA

(71) Applicant: General Electric Company, Schenectady, NY (US)

(72) Inventors: Fuxiao Xin, San Diego, CA (US); Abhinav Saxena, San Ramon, CA (US); Jianbo Yang, San Ramon, CA (US); Achalesh Pandey, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 169 days.

(21) Appl. No.: 15/705,683

(22) Filed: Sep. 15, 2017

(65) Prior Publication Data
US 2019/0086911 A1   Mar. 21, 2019

(51) Int. Cl.
| | | |
|---|---|---|
| G05B 23/02 | (2006.01) | |
| G06K 9/00 | (2006.01) | |
| G05B 13/02 | (2006.01) | |
| G06K 9/62 | (2006.01) | |
| G05B 17/02 | (2006.01) | |

(52) U.S. Cl.
CPC ..... *G05B 23/0251* (2013.01); *G05B 13/0275* (2013.01); *G05B 23/0283* (2013.01); *G06K 9/00536* (2013.01); *G06K 9/6284* (2013.01); *G05B 17/02* (2013.01); *G05B 23/0245* (2013.01)

(58) Field of Classification Search
CPC ............ G05B 23/0251; G05B 23/0245; G05B 13/0275; G05B 17/02; G05B 23/0283; G06K 9/00536; G06K 9/6284
See application file for complete search history.

(56) References Cited

U.S. PATENT DOCUMENTS

| | | | |
|---|---|---|---|
| 5,602,761 A | * | 2/1997 | Spoerre .................. G01H 1/003 702/179 |
| 6,415,395 B1 | | 7/2002 | Varma et al. |
| 6,622,264 B1 | | 9/2003 | Bliley et al. |
| 6,725,398 B1 | | 4/2004 | Varma et al. |
| 7,308,385 B2 | | 12/2007 | Wegerich et al. |
| 7,403,869 B2 | | 7/2008 | Wegerich et al. |
| 7,885,384 B2 | | 2/2011 | Mannar et al. |
| 8,103,463 B2 | | 1/2012 | Kalgren et al. |

(Continued)

OTHER PUBLICATIONS

Peng, Wei et al., "Mining Log Files for Data-Driven System Management", SIGKDD Explorations, vol. 7, Issue 1, 2006, (pp. 44-51, 8 total pages).

(Continued)

*Primary Examiner* — Bryan Bui
(74) *Attorney, Agent, or Firm* — Buckley, Maschoff & Talwalkar LLC (57) ABSTRACT

According to some embodiments, system and methods are provided, comprising receiving, at a machine health module, non-parametric data associated with operation of an installed product; generating, via the machine health module, a health status for at least one of a failure type and a remaining useful life of the installed product, based on the received non-parametric data; and generating an operating response of the installed product based on the generated health status. Numerous other aspects are provided.

22 Claims, 4 Drawing Sheets

(56) References Cited

U.S. PATENT DOCUMENTS

| | | | |
|---|---|---|---|
| 8,165,849 B2 | 4/2012 | Mannar et al. | |
| 8,301,406 B2* | 10/2012 | Lee | G05B 23/0254 |
| | | | 702/77 |
| 8,311,774 B2 | 11/2012 | Hines et al. | |
| 8,849,586 B1* | 9/2014 | Garvey | G07C 3/08 |
| | | | 702/34 |
| 2004/0243636 A1 | 12/2004 | Hasiewicz et al. | |
| 2005/0278143 A1 | 12/2005 | Wegerich et al. | |
| 2010/0023307 A1* | 1/2010 | Lee | G05B 23/0254 |
| | | | 703/7 |

OTHER PUBLICATIONS

Rost, Stanislav et al., "Memento: A Health Monitoring System for Wireless Sensor Networks", Sensor and Ad Hoc Communications and Networks, 2006, (pp. 577-584, 10 total pages), http://ieeexplore.ieee.org/abstract/document/4068315/.

Vichare, Nikhil M. et al., "Prognostics and Health Management of Electronics", IEEE Transactions on Components and Packaging Technologies, vol. 29, Issue: 01, Feb. 27, 2006, (pp. 222-229, 8 total pages), DOI: 10.1109/TCAPT.2006, http://ieeexplore.ieee.org/abstract/document/1599514/.

Thornton, Eavan et al., "Application of Failure Mode and Effect Analysis in a Radiology Department", Quality Initiatives, vol. 31, Issue: 01, May 25, 2010, (pp. 281-294, 14 total pages), http://pubs.rsna.org/doi/abs/10.1148/rg.311105018.

Han, Xu et al., "Similarity-Based Bayesian Learning from Semi-structured Log Files for Fault Diagnosis of Web Services", Web Intelligence and Intelligent Agent Technology (WI-IAT), 2010, IEEE/WIC/ACM International Conference, DOI 10.1109/WI-IAT.2010.51, (pp. 589-596, 8 total pages).

\* cited by examiner

MACHINE HEALTH MONITORING, FAILURE DETECTION AND PREDICTION USING NON-PARAMETRIC DATA

BACKGROUND

Industrial equipment or assets, generally, are engineered to perform particular tasks as part of industrial processes. For example, industrial assets can include, among other things and without limitation, manufacturing equipment on a production line, aircraft engines, wind turbines that generate electricity on a wind farm, power plants, locomotives, healthcare or imaging devices (e.g., X-ray or MRI systems) for use in patient care facilities, Computed Tomograpy (CT) scanners used in airport security or otherwise, or drilling equipment for use in mining operations. The design and implementation of these assets often takes into account both the physics of the task at hand, as well as the environment in which such assets are configured to operate and the specific operating control these systems are assigned to.

Assets, including the asset components, typically acquire damage during assigned operations. Unanticipated failures lead to material and productivity losses, as well as strategic losses. Health Monitoring (HM) techniques are employed to monitor and manage assets to minimize such losses. Typically, HM management techniques use parametric data from the assets to monitor and manage the assets, wherever assets are equipped with relevant sensors and such parametric data are available.

It would be desirable to provide systems and methods to improve HM associated with an industrial asset.

BRIEF DESCRIPTION

According to some embodiments, a computer-implemented method includes receiving, at a machine health module, non-parametric data associated with operation of an installed product; generating, via the machine health module, a health status for at least one of a failure type and a remaining useful life of the installed product, based on the received non-parametric data; and generating an operating response of the installed product based on the generated health status.

According to some embodiments, a system includes a machine health module; a memory storing processor-executable process steps; and a non-parametric data processor coupled to the memory, and in communication with the machine health module and operative to execute the processor-executable steps to cause the system to: receive, at a machine health module, non-parametric data associated with operation of an installed product; generate, via the machine health module, a health status for at least one of a failure type and a remaining useful life of the installed product, based on the received non-parametric data; and generate an operating response of the installed product based on the generated health status.

According to some embodiments, a non-transitory, computer-readable medium storing instructions that, when executed by a computer processor, cause the computer processor to receive, at a machine health module, non-parametric data associated with operation of an installed product; generate, via the machine health module, a health status for at least one of a failure type and a remaining useful life of the installed product, based on the received non-parametric data; and generate an operating response of the installed product based on the generated health status.

A technical effect of some embodiments of the invention is an improved and/or computerized technique and system for monitoring an asset using non-parametric data. As used herein, the term "non-parametric data" refers to any data beyond machine sensor data which cannot be stored in relational databases. As used herein, "non-parametric data" is data that is recorded in a free form manner (e.g., unstructured) and recorded for a purpose besides monitoring a health of an asset. Some examples of such data may include, but not limited to, operating logs from expected asset operation, maintenance and repair logs, non-operation logs such as machine calibration runs, control software logs, etc. Such data may be generated asynchronously at different frequencies, may not follow a particular standard format, or may even be generated at different levels of time and space granularities. During operation of the asset, non-parametric data may be generated as a by-product of that operation. As such, non-parametric data may be readily available. Parametric data, on the other hand, may be based on a fixed set of characteristics, and may have a defined structure. For example, parametric data may be temperature, pressure, and flow, received from sensors in the system. As such, parametric data may often be more expensive to collect due to the association with additional sensing and control systems, and may not always be available (e.g., in legacy systems). Embodiments provide for the prognostic and diagnostic health monitoring and maintenance of assets in the absence of parametric data.

Parametric data based analysis may also suffer from data-quality issues. Embodiments provide further benefits including the improvement of confidence in parametric data analysis via corroboration with non-parametric data.

Non-parametric data from the asset may be used to derive predictions and diagnoses for the asset that may help improve the overall productivity and, thereby, improve effectiveness of the asset and reduce costs for maintenance and repairs.

As described above, the installed product 104 may be instrumented by computer systems, which may generate large amounts of log data in real time. The records in the log data may describe the status of the components of the system, such as starting or stopping a service, switching functionality, printing out software configuration/execution errors and so on. Moreover, the records in the log files may be more self-explanatory, as compared to parametric data, as they may be uniquely mapped to the corresponding scripts of the running software in the installed product. It is noted that the log data may be system-self generated with minimal extra cost, making the use of log mining of nonparametric data an attractive solution to build a health management system. It is further noted that one or more embodiments may execute the machine health module 102 in parallel for use in a big data scenario (e.g., by leveraging big data techniques like Spark and Hadoop).

In one or more embodiments, the output of a machine health module may be used as input to systems associated with the asset(s) and/or to make decisions or recommendations associated with the asset (e.g., when to take a fleet out of service for repairs; what additional repairs should be made). One or more embodiments may also provide for the derivation of non-parametric data-driven insights into efficacy of current processes related, but not limited, to maintenance/repair effectiveness, asset servicing schedules, case management and communication systems, etc. The inventors note that even in situations where parametric data are available and in use for HM, the outcomes may often not be conclusive nor provide sufficient confidence to act upon due to noisy environments, unexpected sensor failures, or other data quality issues. In such situations, one or more embodiments may provide for non-parametric data to be processed to provide additional evidence to improve confidence in health estimation of the assets. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

During the course of operation throughout an asset's lifecycle, the asset may fail due to internal failures (e.g., usage related degradation, internal faults and failures) or external root causes (e.g., usage overload, harsh environments). Unanticipated failures may lead to material and productivity losses and even strategic losses. Techniques for asset health monitoring (HM) are therefore employed to monitor and manage assets to minimize such losses. HM techniques generally include detection, diagnostics and prediction techniques that conventionally make use of parametric data available from the asset or fleet of assets to learn about nominal system behavior and to report any deviation from normalcy. In many instances, the parametric data is obtained as part of monitoring instrumentation (e.g., sensors) installed on the assets for the purpose of collecting the parametric data from the assets to monitor them. However, often times such parametric data may not be available either because legacy systems are not equipped with relevant sensing instrumentation or data are not accessible due to a variety of other reasons including but not limited to proprietary reasons, security protocols, or lack of proper infrastructure to systematically extract data from the assets.

Non-parametric data are, however, often collected for a variety of other non-HM related reasons, which often indirectly contain HM related information. When the non-parametric data is processed, as described below in one or more embodiments, the non-parametric data may be used to extract HM related information. The HM related information may be extracted. in absence of parametric data availability.

One or more embodiments provide systems and methods to improve HM associated with an industrial asset, and expand HM coverage to assets where parametric data are not available.

In one or more embodiments, non-parametric data available from the asset(s) may be used in HM techniques. In one or more embodiments, non-parametric data sources may include operator logs, machine calibration logs, machine software logs, event history data logs and maintenance and repair logs. While these logs may not typically be meant for collecting data for asset health assessment, embodiments may use this data to indirectly infer degradation in system health. Embodiments may also provide for the real-time use of detecting impending failures in assets (e.g., scanning devices used in airport security) using the non-parametric data. It is noted that one or more embodiments may predict the status of the installed product 104 without knowing if the non-parametric data 108 contains information related to a fault.

Some embodiments relate to digital twin modeling. "Digital twin" state estimation modeling of industrial apparatus and/or other mechanically operational entities may estimate an optimal operating condition, remaining useful life, operating performance such as heart rate or other metric, of a twinned physical system using sensors, communications, modeling, history and computation. It may provide an answer in a time frame that is useful, that is, meaningfully priori to a projected occurrence of a failure event or suboptimal operation. The information may be provided by a "digital twin" of a twinned physical system. The digital twin may be a computer model that virtually represents the state of an installed product. The digital twin may include a code object with parameters and dimensions of its physical twin's parameters and dimensions that provide measured values, and keeps the values of those parameters and dimensions current by receiving and updating values via outputs from sensors embedded in the physical twin. The digital twin may have respective virtual components that correspond to essentially all physical and operational components of the installed product and combinations of products or assets that comprise an operation.

As used herein, references to a "digital twin" should be understood to represent one example of a number of different types of modeling that may be performed in accordance with teachings of this disclosure.

The term "installed product" should be understood to include any sort of mechanically operational entity, including, but not limited to, computed tomography (CT) scanners, jet engines, locomotives, gas turbines, medical equipment and wind farms and their auxiliary systems as incorporated. The term is most usefully applied to large complex systems with many moving parts, numerous sensors and controls installed in the system. The term "installed" includes integration into physical operations such as the use of CT scanners as part of an airport security system, engines in an aircraft fleet whose operations are dynamically controlled, a locomotive in connection with railroad operations, or apparatus construction in, or as part of, an operating plant building, machines in a factory or supply chain and etc.

As used herein, the term "automatically" may refer to, for example, actions that may be performed with little or no human interaction.

Figure 1:
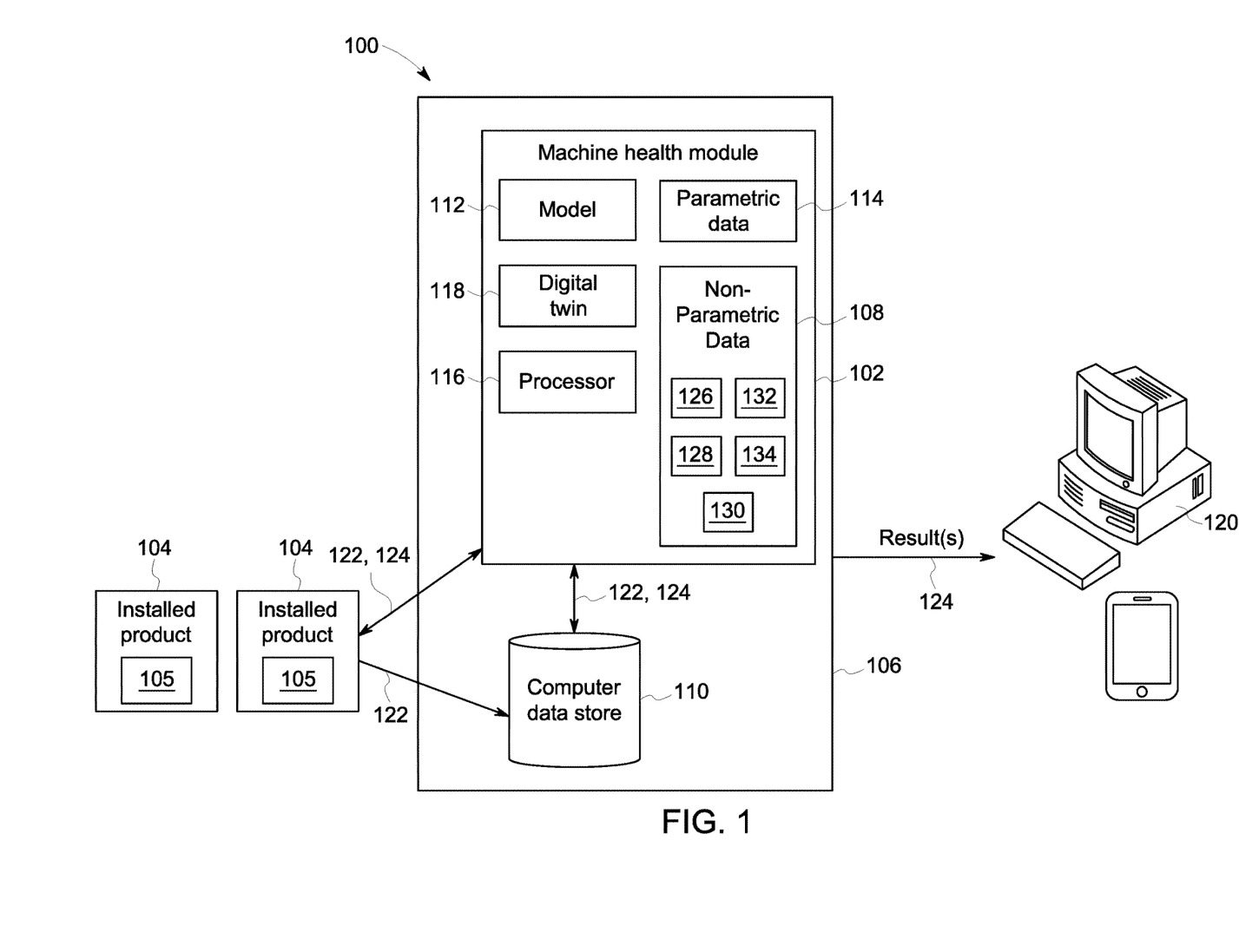
FIG. 1 illustrates a system according to some embodiments.

Turning to FIG. 1, is a block diagram of an example operating environment or system 100 in which a machine health module 102 may be implemented, arranged in accordance with at least one embodiment described herein. FIG. 1 represents a logical architecture for describing processes according to some embodiments, and actual implementations may include more or different components arranged in other manners.

The system 100 may include at least one "installed product" 104. While two installed products 104 are shown herein to represent a fleet of installed products, any suitable number may be used. It is noted that each installed product 104 communicates with a platform 106, and elements thereof, in a same manner, as described below. As noted above, the installed product 104 may be, in various embodiments, a complex mechanical entity such as a CT scanner in an airport or hospital amongst a fleet (e.g., two or more CT scanners or other assets), the production line of a factory, a gas-fired electrical generating plant, a jet engine on an aircraft amongst a fleet, a wind farm, a locomotive, etc. As used herein, the terms "installed product" and "asset" may be used interchangeably. The installed product 104 may include a considerable (or even very large) number of physical elements or components 105, which for example may include turbine blades, fasteners, rotors, bearings, support members, housings, etc. As used herein, the terms "physical element" and "component" may be used interchangeably. The installed product 104 may also include subsystems, such as sensing and localized control, in one or more embodiments.

In some embodiments, the platform 106 may include a computer data store 110 that may provide information to the machine health module 102 and store results from the machine health module 102. The machine health module 102 may include non-parametric data 108, a model 112, parametric data 114, one or more processing elements 116, and a digital twin 118.

The processor 116 may, for example, be a conventional microprocessor, and may operate to control the overall functioning of the machine health module 102. In one or more embodiments, the processor 116 may be programmed with a continuous or logistical model of industrial processes that use the one or more installed products 104.

In one or more embodiments, the data store 110 may comprise any combination of one or more of a hard disk drive, RAM (random access memory), ROM (read only memory), flash memory, etc. The data store 110 may store software that programs the processor 116 and the machine health module 102 to perform functionality as described herein.

The data store 110 may support multi-tenancy to separately support multiple unrelated clients by providing multiple logical database systems which are programmatically isolated from one another.

The data stored in data store 110 may be received from disparate hardware and software systems associated with the installed product 104, or otherwise, some of which may not be inter-operational with one another. The systems may comprise a back-end data environment employed in a business, industrial, or personal context. The data may be pushed to data store 110 and/or provided in response to queries received therefrom.

The data may be included in a relational database, a multi-dimensional database, an eXtendable Markup Language (XML) document, and/or any other structured data storage system. The physical tables of data store 110 may be distributed among several relational databases, multi-dimensional databases, and/or other data sources. The data of data store 110 may be indexed and/or selectively replicated in an index.

The data store 110 may implement an "in-memory" database, in which volatile (e.g., non-disk-based) storage (e.g., Random Access Memory) is used both for cache memory and for storing data during operation, and persistent storage (e.g., one or more fixed disks) is used for offline persistency of data and for maintenance of database snapshots. Alternatively, volatile storage may be used as cache memory for storing recently-used database data, while persistent storage stores data. In some embodiments, the data comprises one or more of conventional tabular data, row-based data stored in row format, column-based data stored in columnar format, and object-based data.

The machine health module 102, according to some embodiments, may access the data store 110 and utilize the processing elements 116 to generate the model 112, that when executed, may output results that may be transmitted to (and in some instances presented on) at least one of various user platforms 120 or to other systems (not shown), as appropriate (e.g., for display to, and manipulation by, a user). In one or more embodiments, the results of the model 112 may be used to operate the installed product, operate another system, or be input to another system.

A communication channel 122 may be included in the system 100 to supply data from at least one of the installed product 104 and the data store 110 to the machine health module 102.

In some embodiments, the system 100 may also include a communication channel 124 to supply output from the machine health module 102 to at least one of user platforms 120, or to other systems. In some embodiments, signals received by the user platform 120, may cause modification in the state or condition or another attribute of the installed product 104.

As used herein, devices, including those associated with the system 100 and any other devices described herein, may exchange information and transfer data ("communication") via any number of different systems, including one or more wide area networks (WANs) and/or local area networks (LANs) that enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

A user may access the system 100 via one of the user platforms 120 (a control system, a desktop computer, a laptop computer, a personal digital assistant, a tablet, a smartphone, etc.) to access the machine health module 102 and information about and/or manage the installed product 104 in accordance with any of the embodiments described herein. According to one or more embodiments, the system 100 may execute program code of a software application for presenting interactive graphical user display interfaces to allow interaction with the machine health module 102.

Figure 2:
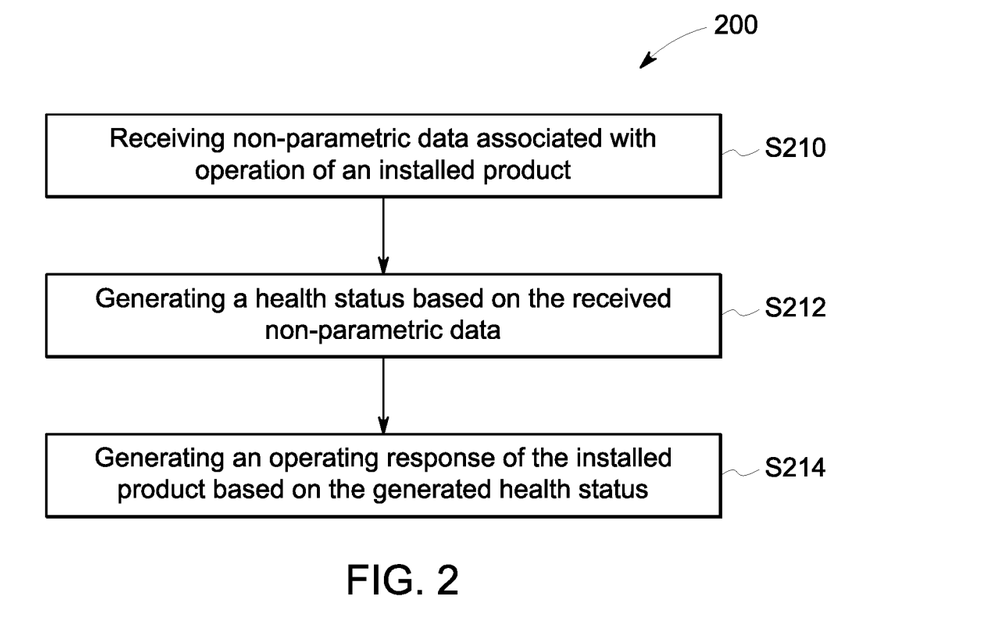
FIG. 2 illustrates a flow diagram according to some embodiments.

Turning to FIG. 2, a flow diagram of an example of operation according to some embodiments is provided. In particular, FIG. 2 provides a flow diagram of a process 200, according to some embodiments. Process 200, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the process 200 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow chart(s) described herein do not imply a fixed order to the steps, and embodiments of the present invention may be practiced in any order that is practicable.

Prior to beginning the process 200, non-parametric data 108 is acquired during the normal operation of the installed product 104. In one or more embodiments, the non-parametric data 108 may be acquired from at least one of an operator log 126, a machine calibration log 128, a machine software log 130, an event history data log 132, and a maintenance and repair log 134. Other suitable non-parametric data sources may be used. It is noted that while one of each non-parametric data source is described herein, any suitable number of each non-parametric data source may be used (e.g., one or more operator logs 126, one or more machine calibration logs 128, etc.).

The operator log 126 may, in one or more embodiments, be a day-to-day operational log for the installed product 104. The operator log 126 may include non-parametric data such as machine loading, throughput, operator id, efficiency, usage, volume, delays, etc. In one or more embodiments, the generated prognosis/diagnosis may depend on non-parametric data 108 provided by the operator log 126. For example, different locations may be associated with different operating environments (e.g., climate), so a CT scanner on an airport tarmac may behave differently in New York versus Arizona.

In one or more embodiments, the machine calibration log 128 may include non-parametric data such as reports/logs generated from routine periodic calibration runs before an installed product 104 is used in the normal operation mode. For example, each morning a CT scanner may be calibrated (e.g., adjusted to a particular setting). In one or more embodiments, the amount of calibration may indicate a status of the CT scanner.

The machine software log 130 may be generated on a continuous basis, as each time installed product software performs a step, the step may be recorded in the log as non-parametric data. The machine software log 130 may exist for software debugging and software trouble-shooting purposes. In one or more embodiments, the machine software log 130 may be used for detection of machine (hardware) degradation and/or failure. In one or more embodiments, the machine software log 130 may be used to detect the root cause of an already observed machine failure, as opposed to detecting impending failure before it actually happens.

In one or more embodiments, the event history data log 132 may provide non-parametric data as a recording of various events (e.g., failure, downtime, degradation, etc.) compiled over a time window. In one or more embodiments, this data may be used to: generate failure mode pareto, analyze efficiency bottlenecks or weak links in the process. In one or more embodiments, the non-parametric data 108 in the event history data log 132 may provide ground truth (e.g., evidence and record of observed failures), which may be used for training data-driven models, such as, but not limited to, classification and regression for health monitoring. Furthermore, these ground truth data may also be used for measuring a model's prediction performance against actual events.

The maintenance and repair log 134 may, in one or more embodiments, provide non-parametric data 108 that details a case history for the installed product 104, including notes attached by a field service engineer (FSE) in raw or semi-structured text format. As described above, the maintenance and repair log 134 may record every maintenance and repair action associated with the installed product 104, and may include details about what happened to the installed product 104 and why it happened. In one or more embodiments, the maintenance and repair log 134 may be created from event histories such as failure events, maintenance events, etc.

Initially at S210, non-parametric data 108 is received at a machine health module 102. In one or more embodiments, the non-parametric data 108 may be received in response to an individual's request to determine and/or monitor a health status of the installed product 104, or may be received in response to a request from a process that may be executed at a set time (e.g., continually, in intervals of 10 minutes, 10 hours, 10 days, etc.) to monitor the health status of the installed product 104. In one or more embodiments, the non-parametric data 108 may be received from one or more of the operator log 126, the machine calibration log 128, the machine software log 130, the event history data log 132, maintenance and repair log 134 or any other suitable source.

In one or more embodiments, the machine health module 102 may determine which non-parametric data 108 to access based on at least one of non-parametric data availability and the particular health assessment being made. For example, a particular non-parametric data source (e.g., machine software logs 130) may not be accessible to all people, or may not be available. In one or more embodiments, the source (e.g., operator log 126, machine calibration log 128, machine software log 130, event history data log 132, and maintenance and repair log 134) of the non-parametric data 108 may be associated with different types of failure. For example, to study the repeat failure patterns and determine what failure modes to expect given a recent history of events, the machine health module 102 may need event history data log 132 non-parametric data, but not the machine software log 130 non-parametric data. It is noted that in one or more embodiments, since the non-parametric data is not originally collected data for machine health assessment, combining non-parametric data from different sources, as well as combining data from non-parametric and parametric sources, described below, may provide a more accurate assessment of failure detection and remaining useful life prediction.

Turning back to the process 200, health status is generated in S212 for the installed product 104 based on the received non-parametric data. In one or more embodiments, health status is at least one of a prognosis and a diagnosis. As described above, raw non-parametric data 108 may be unstructured, and may include data in free-form text descriptions, audio files, pictures etc. In one or more embodiments, as part of the prognosis/diagnosis generation step, the machine health module 102 may pre-process the received non-parametric data 108. For example, the received non-parametric data 108 may be scrubbed by any suitable scrubbing methods (e.g., natural language processing techniques) to focus on most relevant information (e.g., words, codes, failure modes, service calls, topic models, event time). In one or more embodiments, text-descriptions may be broken into individual terms and a document term frequency matrix (DTM) may be created as extracted features for downstream analytics. Then, in one or more embodiments, the machine health module 102 may execute the model 112 with the pre-processed received non-parametric data 108 to generate the prognosis and/or diagnosis. In one or more embodiments, the prognosis may be for at least one of a failure type and a remaining useful life of the installed product 104.

In one or more embodiments, the prognosis/diagnosis generated by the machine health module 102 using the non-parametric data 108 may include at least one of anomaly detection (e.g., detect anomalies in multivariate feature trends over time that may correlate with observed failures; detect changes in error code patterns in logs when comparing nominal machine operations to times close to failure conditions), type of first failure (e.g., distinguish between failure modes based on difference in error code patterns), a predicted time period for a failure (e.g., predict failure modes using data several hours prior to failures to provide advanced warnings), a second failure associated with the first failure, and a remaining useful life of the installed product.

In one or more embodiments, the machine health module 102 may derive correlations between changes in non-parametric data and observed failure modes through association rule mining.

In a non-exhaustive example, the machine software log 130 may provide a recordation of each step being performed by one or more installed products 104. When the installed product is operating in a normal manner, the data (e.g., software codes) in the machine software log 130 may follow a particular pattern. However, when a problem occurs, or when operation of the installed product 104 is degrading, the software may try to overcome these problems, and the sequence of software codes in the machine software log 130 may change. This change may be detected by the machine health module 102. Then this change may be correlated to failure conditions.

In one or more embodiments, when the machine health module 102 receives the non-parametric data (in this example, from the machine software log 130, and the data in the log may be pre-processed, as described below. The data may be pre-processed based on available prior knowledge. As described below, the raw data may be noisy, have a less than ideal structure and may be distributed among different files and folders. As part of pre-processing, the data in the log may be parsed to focus on critical codes close to failures; a continuous log across days may be created, and irrelevant codes may be removed. In one or more embodiments, additional de-noising processes may be applied.

Next, the machine health module 102 may apply feature engineering to the pre-processed data to extract all relevant information and interpret them from a physical perspective for predictive analysis. In one or more embodiments, feature engineering represents and transforms raw data though mathematical functions such that relevant information in data are highlighted. The relevant data then may be used by the models 112 for predictions and diagnoses, as described below. In one or more embodiments, feature engineering may include feature extraction via text mining, for example, and a physical interpretation of the extracted features. With feature extraction, the machine health module 102 may focus on the frequency of an error code in a time window prior to a failure. Of note, besides extracting the error codes, the features for the normal instances are also generated for feature extraction to learn normal behavior. In one or more embodiments, the relative importance of each feature may be evaluated, and the features may be ranked.

Also of note, the frequency feature used with non-parametric data differs from that in conventional text mining in several aspects. As an example of a first aspect, unlike traditional text mining methods, the frequency feature used herein is extracted on every time separated segment of data specified by a time window, rather than on a per document basis. This is because an important aspect in a prognostic problem is that of temporal sequence of events or temporal pattern of degradation. As an example of a second aspect, only specific domain specified terms may be used to compute these frequency features, unlike for all terms in a typical document analysis. And, as an example of a third aspect, to capture finer grain temporal patterns in log data, the frequency feature may be extracted at multiple time scales including very short time-intervals (e.g., a per hour (or less) basis). The inventors note that traditional text mining does not take time into account. By leveraging time to generate frequency features, one or more embodiments are creating ways to use the time information in log data.

With physical interpretation, the machine health module 102 may determine one or more patterns to associate with extracted features. With physical interpretation of extracted features, the feature engineering process of the machine health module 102 may analyze the cumulative frequency of a selected code for normal instances and abnormal instances within a specified time window prior to a failure. Trend visualizations may then be used to explain the difference in observed patterns. For example, within the imposed time window, the occurrence of each code for a type of key word may be counted for every one hour period. Next the mean and standard deviation may be computed for each code's frequency, over all instances of a failure type. Then the cumulative hourly count of a code for all the codes may be plotted to provide the trend visualization.

After the physical interpretation, the machine health module 102 may generate the predictive analysis, including at least one of failure detection, failure diagnosis and failure prognosis. With failure prognosis, it may be useful to be able to distinguish changing patterns in these error code patterns earlier than actual failure so a warning may be issued with a lead-time. In one or more embodiments, the machine health module 102 may: distinguish between healthy and failure scenarios based on observed patterns in the log (i.e. failure detection); distinguish between failure modes (i.e., failure diagnosis) based on the different pattern change from the nominal; and detect pattern changes early and provide warnings of impending failures (i.e., failure prognosis) based on the patterns changing earlier than the actual failure.

Finally, the machine health module 102 may execute a correlation analysis of different types of error codes to provide underlying relationships among various pair of error codes. In one or more embodiments, a correlation may be determined between at least two extract feature pairs using Pearson's correlation co-efficient, or any other suitable correlation mechanism.

As another non-exhaustive example, the machine health module 102 may determine, based on the non-parametric data 108 provided by the maintenance and repair log 134, that when bearing A is replaced on the installed product 104, bearing Y also should also be replaced, or another failure will occur in one week. As used herein, this example may be referred to as a "repeat call analysis." In one or more embodiments, the machine health module 102 may use rule mining (e.g., sequential pattern mining) in the repeat call analysis to determine which failure modes occur together or given an observed failure mode, what are the chances that a known failure mode could occur within a specified amount of time. The repeat call analysis may determine whether the repeat calls are among particular installed products or a particular group of installed products. While the example refers to a repeat of the same failure type (replacement of bearing) within a specified period of time, in one or more embodiments, a repeat call analysis may also be executed for any repeat call for service of the same installed product 104 within a specific time, even if the call is for different failures.

Remaining Useful Life (RUL) (e.g., how long before the parts need to be replaced), may be another example where the predictive analysis described herein by one or more embodiments may be used. For example, if a lifelong log record of the same type of parts is available, the machine health module 102 may use this log to build predictive models to predict at any given point in life what is the RUL. The inventors note this analysis will be beneficial to apply on parts that are still being used to estimate when they may need to be replaced.

While the examples herein were described with respect to the feature extraction being related to the accumulated frequency of error codes, the mean, the medium, and the max and the min of the frequency of the error codes per hour within a time window may also be used by the machine health module 102 to generate a prognosis/diagnosis. Additionally, when time information is consistently present, the machine health module 102 may also apply other traditional time-series data analysis methods including, for example, first order autocorrelation and trend analysis, to provide insights on future expected error rates and risks.

In one or more embodiments, the generated prognosis and/or diagnosis may be formulated in a form that corresponds to outputs typically generated from parametric data (e.g., failure detection scores, detection probability, failure root cause, and remaining useful life estimate, etc.). It is noted that the similar format may enable a comparison between one or more generated prognoses and/or diagnoses using non-parametric data and parametric data, which may result in a more accurate prognosis and/or diagnosis. For example, when the prognosis/diagnosis using the non-parametric data is the same as, or approximately the same as, the prognosis/diagnosis using the parametric data, the machine health module 102, in one or more embodiments, may generate a higher confidence level indicating that the prognosis is accurate, as compared to when the two prognosis/diagnosis are different. As another example, when the generated prognosis/diagnosis is the same, or approximately the same, using different non-parametric data sources (e. g., operator log 126, machine calibration log 128, machine software log 130, and event history data log 132), a higher confidence level may be generated indicating a higher likelihood that the prognosis/diagnosis is accurate. In one or more embodiments, the confidence level may be user- and/or system-defined.

Returning back to the process 200, in S214, an operating response of the installed product 104 is generated in response to the determined prognosis/diagnosis. In one or more embodiments, as described above, for example, the prognosis about an event may be used to manage operations of the installed product 104 (e.g., the prediction may be returned to the installed product or transmitted to another system for managing operations of the installed product). For example, if RUL is estimated, warnings may be issued when the term of life is approaching for a part and maintenance may be scheduled accordingly to minimize machine downtime. In one or more embodiments, the determined prognosis may be used together with cost data (e.g., cost of service-calls, cost of repeating repairs, downtime due to incorrect initial diagnosis resulting in repeat calls, priority among different failures, etc.) to identify any changes to the operation of the installed product 104.

Figure 3:
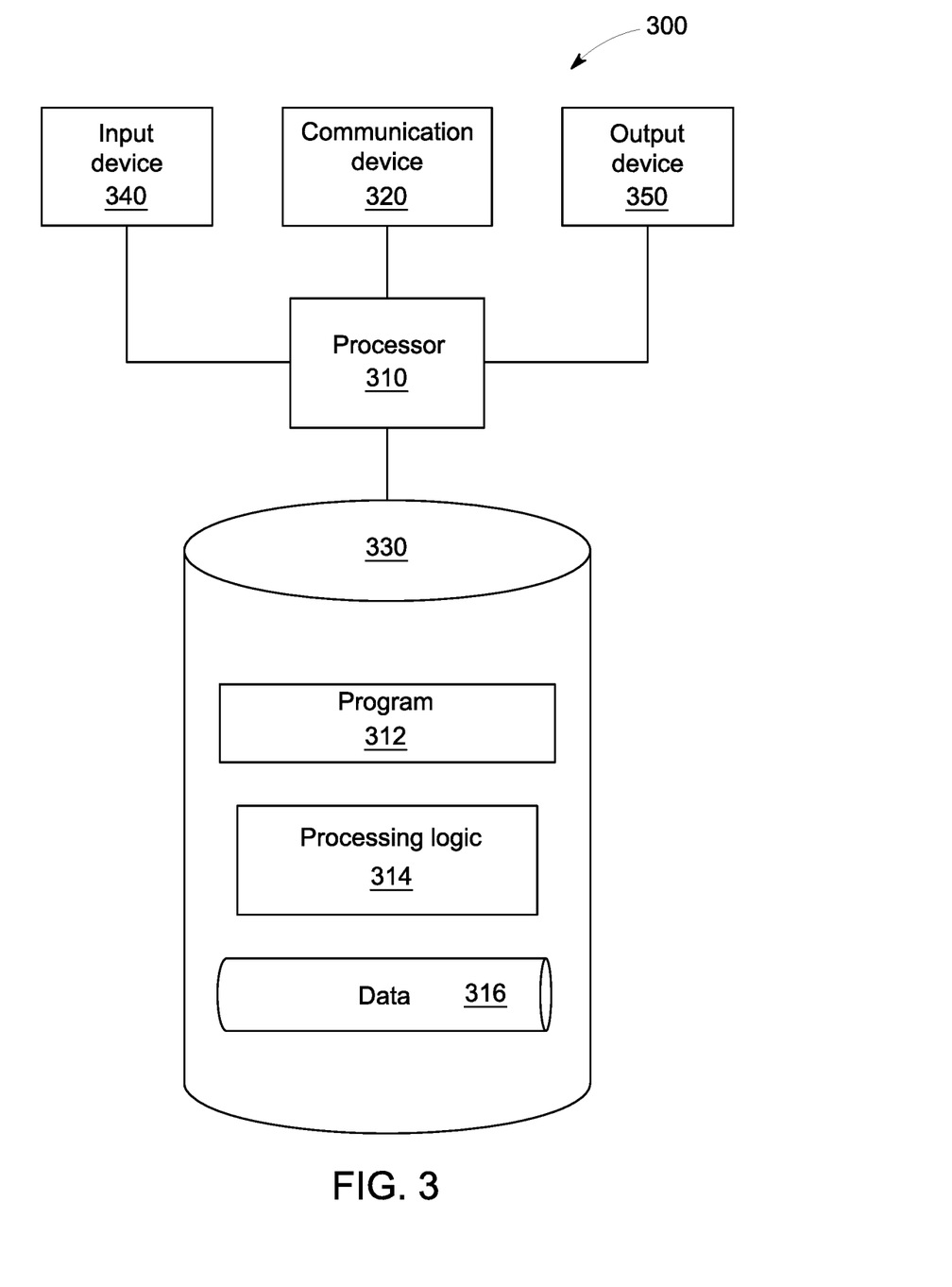
FIG. 3 illustrates a block diagram of a system according to some embodiments.

Note the embodiments described herein may be implemented using any number of different hardware configurations. For example, FIG. 3 illustrates a non-parametric data platform 300 that may be, for example, associated with the system 100 of FIG. 1. The non-parametric data platform 300 comprises a non-parametric data processor 310 ("processor"), such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more users. The non-parametric data platform 300 further includes an input device 340 (e.g., a mouse and/or keyboard to enter information) and an output device 350 (e.g., to output and display the visualization/manipulations).

The processor 310 also communicates with a memory/storage device 330. The storage device 330 may comprise any appropriate information storage device, including combinations of magnetic storage devices (e.g., a hard disk drive), optical storage devices, mobile telephones, and/or semiconductor memory devices. The storage device 330 may store a program 312 and/or non-parametric data processing logic 314 for controlling the processor 310. The processor 310 performs instructions of the programs 312, 314, and thereby operates in accordance with any of the embodiments described herein. For example, the processor 310 may receive data and then may apply the instructions of the programs 312, 314 to predict a remaining useful life of an asset using non-parametric data.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the platform 300 from another device; or (ii) a software application or module within the platform 300 from another software application, module, or any other source.

It is noted that while progress with industrial equipment automation has been made over the last several decades, and assets have become 'smarter,' the intelligence of any individual asset pales in comparison to intelligence that can be gained when multiple smart devices are connected together. Aggregating data collected from or about multiple assets may enable users to improve business processes, for example by improving effectiveness of asset maintenance or improving operational performance, if appropriate. Industrial-specific data collection and modeling technology may be developed and applied.

In an example, an industrial asset may be outfitted with one or more sensors configured to monitor respective ones of an asset's operations or conditions. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like, such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with, and configuration of, industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Performance Management Platform (APM) technology enabled by state of the art cutting edge tools and cloud computing techniques that may enable incorporation of a manufacturer's asset knowledge with a set of development tools and best practices that may enable asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

The further advancement in sensing, control, simulation and optimization in systems such as the disclosed extends past the current art APM limitations of past operations=future operations and little ability to trade off actions in maintenance or operations in the current period for those of future periods where optimal interventions may be made such as maintenance, assignment, duty limitations, through time, having the benefit of far more accurate starting conditions afforded by the true-up.

Figure 4:
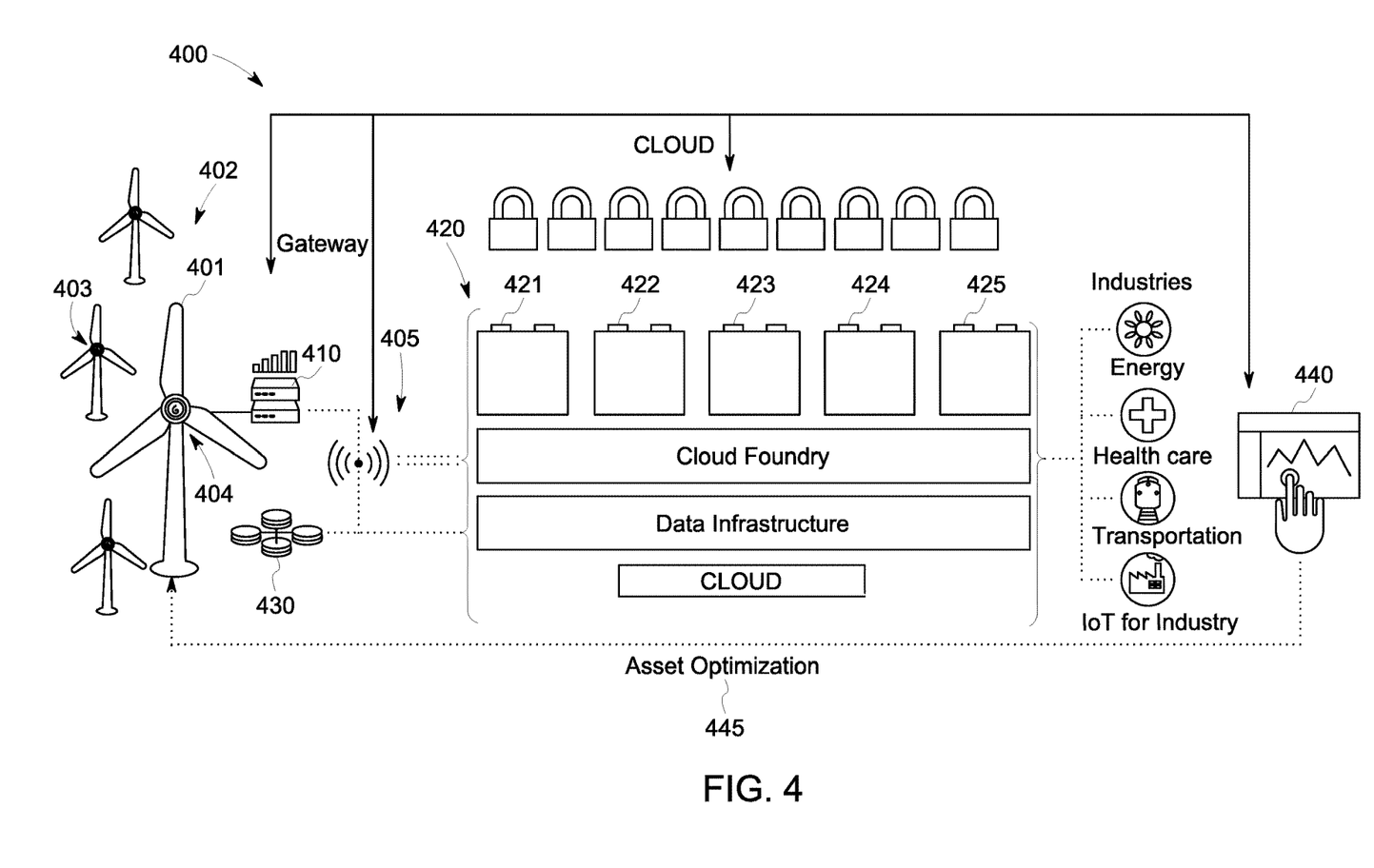
FIG. 4 illustrates a block diagram according to some embodiments.

FIG. 4 illustrates generally an example of portions of a first APM 400. As further described herein, one or more portions of an APM may reside in an asset cloud computing system 420, in a local or sandboxed environment, or may be distributed across multiple locations or devices. An APM may be configured to perform any one or more of data acquisition, data analysis, or data exchange with local or remote assets, or with other task-specific processing devices.

The first APM 400 may include a first asset community 402 that may be communicatively coupled with the asset cloud computing system 420. A plurality of assets 402, 403 may be subject to state estimation at one or more multiple time intervals. Within a given industrial system, there may be estimations of state for more than one system or subsystem such as a blade of a wind turbine 401 or gear 404 associated with the turbine 401. These sub-systems may be combined to estimate the state of damage and performance for an integrated system such as, for example, a windmill, an aircraft engine, a power plant and a train. Other suitable integrated systems may be used. In an example, a machine module 410 receives information from, or senses information about, at least one asset member of the first asset community 402, and configures the received information for exchange with the asset cloud computing system 420. In an example, the machine module 410 is coupled to the asset cloud computing system 420 or to an enterprise computing system 430 via a communication gateway 405.

In an example, the communication gateway 405 includes or uses a wired or wireless communication channel that may extend at least from the machine module 410 to the asset cloud computing system 420. The asset cloud computing system 420 includes several layers. In an example, the asset cloud computing system 420 includes at least a data infrastructure layer, a cloud foundry layer, and modules for providing various functions. In the example of FIG. 4, the asset cloud computing system 420 includes an asset module 421, an analytics module 422, a data acquisition module 423, a data security module 424, and an operations module 425. Each of the modules 421-425 includes or uses a dedicated circuit, or instructions for operating a general purpose processor circuit, to perform the respective functions. In an example, the modules 421-425 are communicatively coupled in the asset cloud computing system 420 such that information from one module may be shared with another. In an example, the modules 421-425 are co-located at a designated datacenter or other facility, or the modules 421-425 can be distributed across multiple different locations.

An interface device 440 may be configured for data communication with one or more of the machine module 410, the gateway 405, or the asset cloud computing system 420. The interface device 440 may be used to monitor or control one or more assets. In an example, information about the first asset community 402 is presented to an operator at the interface device 440. The information about the first asset community 402 may include information from the machine module 410, or the information may include information from the asset cloud computing system 420. In an example, the information from the asset cloud computing system 420 may include information about the first asset community 402 in the context of multiple other similar or dissimilar assets, and the interface device 440 may include options for optimizing one or more members of the first asset community 402 based on analytics performed at the asset cloud computing system 420.

In an example, an operator selects a parameter update for the first wind turbine 401 using the interface device 440, and the parameter update is pushed to the first wind turbine via one or more of the asset cloud computing system 420, the gateway 405, and the machine module 410. In an example, the interface device 440 is in data communication with the enterprise computing system 430 and the interface device 440 provides an operation with enterprise-wide data about the first asset community 402 in the context of other business or process data. For example, choices with respect to asset optimization 445 may be presented to an operator in the context of available or forecasted raw material supplies or fuel costs. In an example, choices with respect to asset optimization 445 may be presented to an operator in the context of a process flow to identify how efficiency gains or losses at one asset may impact other assets. In an example, one or more choices described herein as being presented to a user or operator may alternatively be made automatically by a processor circuit according to earlier-specified or programmed operational parameters. In an example, the processor circuit may be located at one or more of the interface device 440, the asset cloud computing system 420, the enterprise computing system 430, or elsewhere.

Returning again to the example of FIG. 4 some capabilities of the first APM 400 are illustrated. The example of FIG. 4 includes the first asset community 402 with multiple wind turbine assets, including the first wind turbine 401. Wind turbines are used in some examples herein as non-limiting examples of a type of industrial asset that can be a part of, or in data communication with, the first AMP 400.

In an example, the multiple turbine members of the asset community 402 include assets from different manufacturers or vintages. The multiple turbine members of the asset community 402 may belong to one or more different asset communities, and the asset communities may be located locally or remotely from one another. For example, the members of the asset community 402 may be co-located on a single wind farm, or the members may be geographically distributed across multiple different farms. In an example, the multiple turbine members of the asset community 402 may be in use (or non-use) under similar or dissimilar environmental conditions, or may have one or more other common or distinguishing characteristics.

FIG. 4 further includes the device gateway 405 configured to couple the first asset community 402 to the asset cloud computing system 420. The device gateway 405 may further couple the asset cloud computing system 420 to one or more other assets or asset communities, to the enterprise computing system 430, or to one or more other devices. The first AMP 400 thus represents a scalable industrial solution that extends from a physical or virtual asset (e.g., the first wind turbine 401) to a remote asset cloud computing system 420. The asset cloud computing system 420 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 424 in the asset cloud computing system 420. In an example, an external sensor may be used to sense information about a function of an asset, or to sense information about an environment condition at or near an asset. The external sensor may be configured for data communication with the device gateway 405 and the data acquisition module 424, and the asset cloud computing system 420 may be configured to use the sensor information in its analysis of one or more assets, such as using the analytics module 422.

In an example, the first AMP 400 may use the asset cloud computing system 420 to retrieve an operational model for the first wind turbine 401, such as using the asset module 421. The model may be stored locally in the asset cloud computing system 420, or the model may be stored at the enterprise computing system 430, or the model may be stored elsewhere. The asset cloud computing system 420 may use the analytics module 422 to apply information received about the first wind turbine 401 or its operating conditions (e.g., received via the device gateway 405) to or with the retrieved operational model. Using a result from the analytics module 422, the operational model may optionally be updated, such as for subsequent use in optimizing the first wind turbine 401 or one or more other assets, such as one or more assets in the same or different asset community. For example, information about the first wind turbine 401 may be analyzed at the asset cloud computing system 420 to inform selection of an operating parameter for a remotely located second wind turbine that belongs to a different second asset community.

The first AMP 400 includes a machine module 410. The machine module 410 may include a software layer configured for communication with one or more industrial assets and the asset cloud computing system 420. In an example, the machine module 410 may be configured to run an application locally at an asset, such as at the first wind turbine 401. The machine module 410 may be configured for use with, or installed on, gateways, industrial controllers, sensors, and other components. In an example, the machine module 410 includes a hardware circuit with a processor that is configured to execute software instructions to receive information about an asset, optionally process or apply the received information, and then selectively transmit the same or different information to the asset cloud computing system 420.

In an example, the asset cloud computing system 420 may include the operations module 425. The operations module 425 may include services that developers may use to build or test Industrial Internet applications, or the operations module 425 may include services to implement Industrial Internet applications, such as in coordination with one or more other AMP modules. In an example, the operations module 425 includes a microservices marketplace where developers may publish their services and/or retrieve services from third parties. The operations module 425 can include a development framework for communicating with various available services or modules. The development framework may offer developers a consistent look and feel and a contextual user experience in web or mobile applications.

In an example, an AMP may further include a connectivity module. The connectivity module may optionally be used where a direct connection to the cloud is unavailable. For example, a connectivity module may be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 405 between the machine module 410 and the asset cloud computing system 420.

In an example, an AMP may be configured to aid in optimizing operations or preparing or executing predictive maintenance for industrial assets. An AMP may leverage multiple platform components to predict problem conditions and conduct preventative maintenance, thereby reducing unplanned downtimes in the near term or through time by intentional intervention. In an example, the machine module 410 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 410 or at the asset cloud computing system 420, one embodiment having the analytic being a discrete event simulator which changes the exogenous conditions (e.g. weather) and control points, maintenance events, work-scopes and locations, runs replications and computes confidence intervals and contribution to variance over one or more time intervals. In another embodiment, the analytic being a dynamic programming modality. In another embodiment, the analytic being a Monte-Carlo modality.

In response to the detected error conditions, the AMP may issue various mitigating commands to the asset, such as via the machine module 410, for manual or automatic implementation at the asset. In an example, the AMP may provide a shut-down command to the asset in response to a detected error condition. Shutting down an asset before an error condition becomes fatal may help to mitigate potential losses or to reduce damage to the asset or its surroundings. In addition to such an edge-level application, the machine module 410 may communicate asset information to the asset cloud computing system 420.

In an example, the asset cloud computing system 420 may store or retrieve operational data for multiple similar assets. Over time, data scientists or machine learning may identify patterns and, based on the patterns, may create improved physics-based analytical models for identifying or mitigating issues at a particular asset or asset type. The improved analytics may be pushed back to all or a subset of the assets, such as via multiple respective machine modules 410, to effectively and efficiently improve performance of designated (e.g., similarly-situated) assets.

In an example, the asset cloud computing system 420 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration may be useful when an application requires an underlying hardware configuration. The provisioning management and pooling of resources may be done at a granular level, thus allowing optimal resource allocation.

In a further example, the asset cloud computing system 420 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 420 may include a data services module that may facilitate application development. For example, the data services module may enable developers to bring data into the asset cloud computing system 420 and to make such data available for various applications, such as applications that execute at the cloud, at a machine module, or at an asset or other location. In an example, the data services module may be configured to cleanse, merge, or map data before ultimately storing it in an appropriate data store, for example, at the asset cloud computing system 420. A special emphasis has been placed on time series data, as it is the data format that most sensors use.

Security may be a concern for data services that deal in data exchange between the asset cloud computing system 420 and one or more assets or other components. Some options for securing data transmissions include using Virtual Private Networks (VPN) or an SSL/TLS model. In an example, the first AMP 400 may support two-way TLS, such as between a machine module and the security module 424. In an example, two-way TLS may not be supported, and the security module 424 may treat client devices as OAuth users. For example, the security module 424 may allow enrollment of an asset (or other device) as an OAuth client and transparently use OAuth access tokens to send data to protected endpoints.

A plurality of assets 402, 403 may be subject to state estimation at one or multiple time intervals. Within a given industrial system, there may be estimations of state for more than one system or sub-system such as the blade 401 or the gear 404. These subsystems may be combined to estimate the state of damage and performance for an integrated system such as a windmill or aircraft engine or power plant or train.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 310 (FIG. 3). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A computer implemented method comprising:
   receiving, at a machine health module, non-parametric data associated with operation of an installed product;
   generating, via the machine health module, at least one of a diagnosis for a failure type and a prognosis of a remaining useful life of the installed product, based on the received non-parametric data; and
   operating the installed product based on the generated at least one of the diagnosis and the prognosis.

2. The method of claim 1, wherein the non-parametric data is at least one of an operator log, a machine calibration log, a machine software log, an event history data log, and a maintenance and repair log.

3. The method of claim 1, wherein the at least one of the diagnosis and the prognosis for the installed product is generated based on non-parametric data associated with two or more installed products.

4. The method of claim 1, wherein the non-parametric data is any data beyond machine sensor data which cannot be stored in relational databases.

5. The method of claim 1, further comprising:
   comparing the generated at least one diagnosis and prognosis to a second at least one diagnosis and prognosis based on parametric data; and
   generating a confidence level for the generated at least one diagnosis and prognosis and the second at least one diagnosis and prognosis based on the comparison.

6. The method of claim 5, wherein the generated at least one diagnosis and prognosis and the second at least one diagnosis and prognosis are in a same format prior to the comparison.

7. The method of claim 1, wherein generating the at least one diagnosis and prognosis further comprises:
   generating, via the machine health module, the diagnosis for the installed product based on the received non-parametric data.

8. The method of claim 7, wherein the diagnosis is generated based on:
   detecting at least one anomaly in the non-parametric data.

9. The method of claim 1, wherein generating the at least one diagnosis and prognosis further comprises:
   generating the prognosis for the installed product based on the received non-parametric data.

10. The method of claim 1, wherein generating the at least one diagnosis and prognosis further comprises:
    pre-processing the received non-parametric data.

11. The method of claim 10, further comprising:
    applying feature engineering to the pre-processing data.

12. The method of claim 11, wherein feature engineering further comprises:
    extracting one or more features from the pre-processed data; and
    determining one or more patterns to associate with each extracted feature.

13. A system comprising:
    a machine health module;
    a memory storing processor-executable process steps; and
    a non-parametric data processor coupled to the memory, and in communication with the machine health module and operative to execute the processor-executable steps to cause the system to:
    receive, at a machine health module, non-parametric data associated with operation of an installed product;
    generate, via the machine health module, at least one of a diagnosis for a failure type and a prognosis of a remaining useful life of the installed product, based on the received non-parametric data; and
    operate the installed product based on the generated at least one of the diagnosis and the prognosis.

14. The system of claim 13, wherein the non-parametric data is at least one of an operator log, a machine calibration log, a machine software log, an event history data log, and a maintenance and repair log.

15. The system of claim 13, wherein the at least one of the diagnosis and the prognosis for the installed product is generated based on non-parametric data associated with two or more installed products.

16. The system of claim 13, wherein the non-parametric data is any data beyond machine sensor data which cannot be stored in relational databases.

17. The system of claim 13, wherein generating the at least one of the diagnosis and the prognosis further comprises processor-executable steps to cause the system to:
    pre-process the received non-parametric data.

18. The system of claim 17, further comprising processor-executable steps to cause the system to:
    apply feature engineering to the pre-processed data.

19. The system of claim 18, wherein the application of feature engineering further comprises processor-executable steps to cause the system to:
    extract one or more features from the pre-processed data; and
    determine one or more patterns to associate with each extracted feature.

20. A non-transitory computer-readable medium storing program code, the program code executable by a computer system to cause the computer system to:
    receive, at a machine health module, non-parametric data associated with operation of an installed product;
    generate, via the machine health module, at least one of a diagnosis for a failure type and a prognosis of a remaining useful life of the installed product, based on the received non-parametric data; and operating the installed product based on the generated at least one of the diagnosis and the prognosis.

21. The medium claim 20, wherein the non-parametric data is at least one of an operator log, a machine calibration log, a machine software log, an event history data log, and a maintenance and repair log.

22. The medium of claim 21, wherein the non-parametric data is any data beyond machine sensor data which cannot be stored in relational databases.

* * * * *